(12) United States Patent
Hu

(10) Patent No.: US 11,453,407 B2
(45) Date of Patent: Sep. 27, 2022

(54) METHOD AND APPARATUS OF MONITORING SENSOR OF DRIVERLESS VEHICLE, DEVICE AND STORAGE MEDIUM

(71) Applicant: BAIDU ONLINE NETWORK TECHNOLOGY (BEIJING) CO., LTD., Beijing (CN)

(72) Inventor: Taiqun Hu, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 429 days.

(21) Appl. No.: 15/991,424

(22) Filed: May 29, 2018

(65) Prior Publication Data

US 2018/0362051 A1 Dec. 20, 2018

(30) Foreign Application Priority Data

Jun. 20, 2017 (CN) .......................... 201710470598.4

(51) Int. Cl.
*B60W 50/02* (2012.01)
*B60W 60/00* (2020.01)
(Continued)

(52) U.S. Cl.
CPC ........... *B60W 50/0205* (2013.01); *B60Q 9/00* (2013.01); *B60W 60/0018* (2020.02);
(Continued)

(58) Field of Classification Search
CPC ..... B60W 50/0205; B60W 2050/0215; B60W 2420/42; B60W 2420/52; B60W 2420/54; B60W 60/0018; B60W 60/00186; B60W 60/00188; B60Q 9/00; G06K 9/00791; G06K 9/00818; G06K 9/00798

See application file for complete search history.

(56) References Cited

U.S. PATENT DOCUMENTS 9,168,924 B2 10/2015 Lee et al.
9,221,396 B1* 12/2015 Zhu ................... G06K 9/00791
(Continued)

FOREIGN PATENT DOCUMENTS

CN 201269862 Y 7/2009
CN 102419586 A 4/2012
(Continued)

OTHER PUBLICATIONS

Chinese Office Action dated Jan. 4, 2021.

*Primary Examiner* — Nadeem Odeh
(74) *Attorney, Agent, or Firm* — Lando & Anastasi, LLP

(57) ABSTRACT

The present disclosure provides a method and apparatus of monitoring a sensor of a driverless vehicle, a device and a storage medium, wherein the method comprises: monitoring a physical state of a to-be-monitored sensor; monitoring a data transmission state of the to-be-monitored sensor; monitoring output data of the to-be-monitored sensor, and using predetermined data to perform cross-validation for the output data; when any monitoring result gets abnormal, determining the to-be-monitored sensor as getting abnormal, and giving an alarm. The solution of the present disclosure may be applied to improve safety of the driverless vehicle.

9 Claims, 3 Drawing Sheets

(51) Int. Cl.
  *B60Q 9/00*   (2006.01)
  *G06V 10/98*  (2022.01)
  *G06V 20/56*  (2022.01)
  *G06V 20/58*  (2022.01)

(52) U.S. Cl.
  CPC  *B60W 60/00186* (2020.02); *B60W 60/00188* (2020.02); *G06V 10/98* (2022.01); *G06V 20/56* (2022.01); *G06V 20/582* (2022.01); *B60W 2050/0215* (2013.01); *B60W 2420/42* (2013.01); *B60W 2420/52* (2013.01); *G06V 20/588* (2022.01)

(56) References Cited

U.S. PATENT DOCUMENTS

| | | | |
|---|---|---|---|
| 10,168,703 B1* | 1/2019 | Konrardy | G05D 1/0231 |
| 10,534,370 B2 | 1/2020 | Cavalcanti et al. | |
| 2013/0151065 A1* | 6/2013 | Ricci | B60W 40/09 701/31.4 |
| 2015/0266490 A1* | 9/2015 | Coelingh | B60W 50/029 701/30.5 |
| 2017/0139411 A1* | 5/2017 | Hartung | G05D 1/0077 |
| 2017/0169627 A1* | 6/2017 | Kim | G01S 7/497 |
| 2018/0039269 A1* | 2/2018 | Lambermont | G01S 13/865 |
| 2018/0050704 A1* | 2/2018 | Tascione | B60W 10/04 |
| 2019/0084562 A1* | 3/2019 | Schroeder | B60W 30/08 |
| 2021/0146939 A1* | 5/2021 | Sari | G06F 11/186 |

FOREIGN PATENT DOCUMENTS

| | | |
|---|---|---|
| CN | 103359114 A | 10/2013 |
| CN | 104316099 A | 1/2015 |
| CN | 106463049 A | 2/2017 |
| CN | 106840242 A | 6/2017 |
| KR | 20140042346 A | 4/2014 |
| WO | 2015151055 A1 | 10/2015 |

\* cited by examiner

METHOD AND APPARATUS OF MONITORING SENSOR OF DRIVERLESS VEHICLE, DEVICE AND STORAGE MEDIUM

The present application claims the priority of Chinese Patent Application No. 2017104705984, filed on Jun. 20, 2017, with the title of "Method and apparatus of monitoring sensor of driverless vehicle, device and storage medium". The disclosure of the above applications is incorporated herein by reference in its entirety.

FIELD OF THE DISCLOSURE

The present disclosure relates to driverless vehicle technologies, and particularly to a method and apparatus of monitoring a sensor of a driverless vehicle, a device and a storage medium.

BACKGROUND OF THE DISCLOSURE

A driverless vehicle, also called an autonomous vehicle, means that the vehicle's surroundings are sensed by sensors, and the vehicle's steering and speed are controlled according to a road, a vehicle position and obstacle information obtained from the sensing so that the vehicle can safely and reliably travel on the road.

The sensors may comprise a positioning sensor, an image sensor, a laser radar sensor, an ultrasonic sensor and an infrared sensor.

Data safety and integrity of sensors, as important data input sources of the driverless vehicle, are of great importance for decision-making control of the driverless vehicle.

Once a sensor operates abnormally, the abnormality causes great impact to the travel safety of the driverless vehicle. Causes for the occurrence of abnormality might comprise physical damages to the sensor, hacker attack and the like.

There is not yet an effective processing manner in the art to solve the above problem.

SUMMARY OF THE DISCLOSURE

In view of the above, the present disclosure provides a method and apparatus of monitoring a sensor of a driverless vehicle, a device and a storage medium, which can improve safety of the driverless vehicle.

Specific technical solutions are as follows:

A method of monitoring a sensor of a driverless vehicle, comprising:

monitoring a physical state of a to-be-monitored sensor;

monitoring a data transmission state of the to-be-monitored sensor;

monitoring output data of the to-be-monitored sensor, and using predetermined data to perform cross-validation for the output data;

when any monitoring result gets abnormal, determining the to-be-monitored sensor as getting abnormal, and giving an alarm.

According to a preferred embodiment of the present disclosure, the using predetermined data to perform cross-validation for the output data comprises:

performing cross-validation for data transmitted from the to-be-monitored sensor by using one of output data of other sensors other than the to-be-monitored sensor, a high-precision map and data output by the to-be-monitored sensor last time, or combinations of at least two thereof.

According to a preferred embodiment of the present disclosure, when the to-be-monitored sensor is a positioning sensor, performing cross-validation for the output data of the to-be-monitored sensor comprises:

determining a lane where a positioning result output by the positioning sensor lies according to the high-precision map;

acquiring an image recognition result obtained according to output data of an image sensor, and determining a lane where the driverless vehicle lies according to the image recognition result;

determining the positioning sensor as getting abnormal if the lane where the positioning result lies is inconsistent with the lane where the driverless vehicle lies;

or comparing the positioning result output by the positioning sensor with a positioning result output by the positioning sensor last time;

determining the positioning sensor as getting abnormal if a difference of the two positioning results does not match the driverless vehicle's travel speed.

According to a preferred embodiment of the present disclosure, when the to-be-monitored sensor is an image sensor, performing cross-validation for the output data of the to-be-monitored sensor comprises:

acquiring an image recognition result obtained according to output data of the image sensor;

if a traffic light or traffic sign is recognized from the image recognition result but it is determined by querying the high-precision map that the traffic light or traffic sign does not exist at a position where the driverless vehicle lies, determining the image sensor as getting abnormal;

or, acquiring an image recognition result obtained according to the output data of the image sensor;

if a vehicle or pedestrian is recognized from the image recognition result but the vehicle or pedestrian is not recognized from a point cloud recognition result obtained according to output data of a laser radar sensor, determining the image sensor as getting abnormal.

According to a preferred embodiment of the present disclosure, when the to-be-monitored sensor is a laser radar sensor, performing cross-validation for the output data of the to-be-monitored sensor comprises:

acquiring a point cloud recognition result obtained according to output data of the laser radar sensor;

if a vehicle or an obstacle on the road is recognized from the point cloud recognition result but the vehicle or obstacle is not recognized from both the image recognition result obtained according to the output data of the image sensor and an ultrasonic recognition result obtained according to output data of an ultrasonic sensor, determining the laser radar sensor as getting abnormal.

An apparatus of monitoring a sensor of a driverless vehicle, comprising: a first monitoring unit, a second monitoring unit, a third monitoring unit and an alarm unit;

the first monitoring unit is configured to monitor a physical state of a to-be-monitored sensor;

the second monitoring unit is configured to monitor a data transmission state of the to-be-monitored sensor;

the third monitoring unit is configured to monitor output data of the to-be-monitored sensor, and use predetermined data to perform cross-validation for the output data;

the alarm unit is configured to, when any monitoring result gets abnormal, determine the to-be-monitored sensor as getting abnormal, and give an alarm.

According to a preferred embodiment of the present disclosure, the third monitoring unit performs cross-validation for data transmitted from the to-be-monitored sensor by using one of output data of other sensors other than the to-be-monitored sensor, a high-precision map and data output by the to-be-monitored sensor last time, or combinations of at least two thereof.

According to a preferred embodiment of the present disclosure, the to-be-monitored sensor is a positioning sensor;

the third monitoring unit determines a lane where a positioning result output by the positioning sensor lies according to the high-precision map, acquires an image recognition result obtained according to output data of an image sensor, determines the lane where the driverless vehicle lies according to the image recognition result, and determines the positioning sensor as getting abnormal if the lane where the positioning result lies is inconsistent with the lane where the driverless vehicle lies;

or the third monitoring unit compares the positioning result output by the positioning sensor with a positioning result output by the positioning sensor last time, and determines the positioning sensor as getting abnormal if a difference of the two positioning results does not match the driverless vehicle's travel speed.

According to a preferred embodiment of the present disclosure, the to-be-monitored sensor is an image sensor;

the third monitoring unit acquires an image recognition result obtained according to output data of the image sensor, and if a traffic light or traffic sign is recognized from the image recognition result but it is determined by querying the high-precision map that the traffic light or traffic sign does not exist at a position where the driverless vehicle lies, determines the image sensor as getting abnormal;

or the third monitoring unit acquires an image recognition result obtained according to the output data of the image sensor, and if a vehicle or pedestrian is recognized from the image recognition result but the vehicle or pedestrian is not recognized from a point cloud recognition result obtained according to output data of a laser radar sensor, determines the image sensor as getting abnormal.

According to a preferred embodiment of the present disclosure, the to-be-monitored sensor is a laser radar sensor;

the third monitoring unit acquires a point cloud recognition result obtained according to output data of the laser radar sensor, and if a vehicle or an obstacle on the road is recognized from the point cloud recognition result but the vehicle or obstacle is not recognized from both the image recognition result obtained according to the output data of the image sensor and an ultrasonic recognition result obtained according to output data of an ultrasonic sensor, determines the laser radar sensor as getting abnormal.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to the solutions of the present disclosure, the to-be-monitored sensor on the driverless vehicle may be monitored in real time, including monitoring the physical state, monitoring the data transmission state and monitoring the output data in a cross-validation manner, thereby finding in time that the sensor gets abnormal and thereby improving the driverless vehicle's safety.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
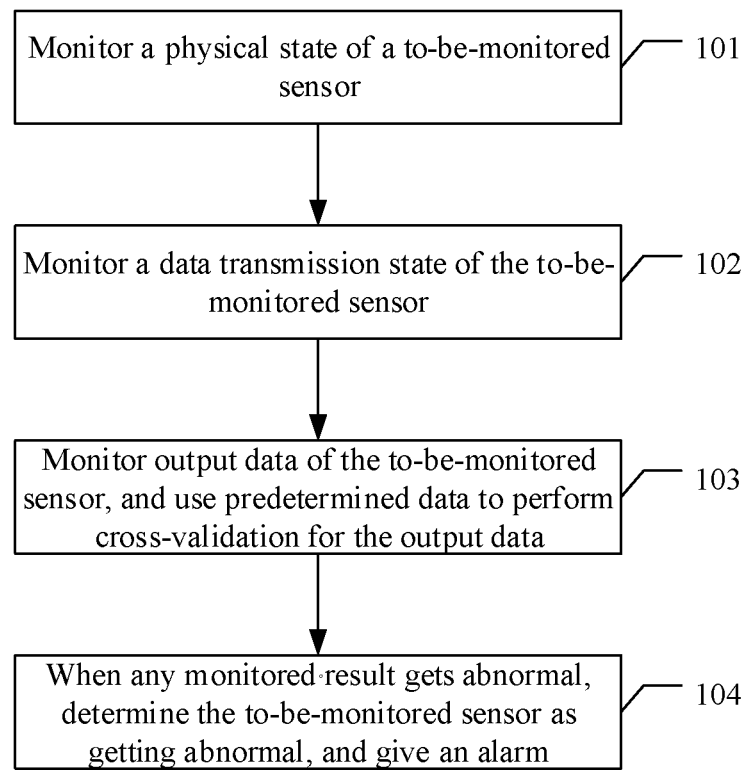
FIG. 1 is a flow chart of an embodiment of a method of monitoring a sensor of a driverless vehicle according to the present disclosure.

FIG. 1 is a flow chart of an embodiment of a method of monitoring sensors of a driverless vehicle according to the present disclosure. As shown in FIG. 1, the embodiment comprises the following specific implementation mode.

In 101 is monitored a physical state of a to-be-monitored sensor;

In 102 is monitored a data transmission state of the to-be-monitored sensor;

In 103, output data of the to-be-monitored sensor is monitored, and predetermined data is used to perform cross-validation for the output data;

In 104, when any monitoring result gets abnormal, the to-be-monitored sensor is determined as getting abnormal, and an alarm is given.

That is to say, if any one of the following happens, the to-be-monitored sensor may be determined as getting abnormal:

physical state abnormality;
data transmission state abnormality;
validation result abnormality.

When cross-validation is performed, the cross-validation may be performed for data transmitted from the to-be-monitored sensor by using one of output data of other sensors other than the to-be-monitored sensor, a high-precision map and data output by the to-be-monitored sensor last time, or combinations of at least two thereof.

The specific type of the to-be-monitored sensor may depend on actual needs, for example, a positioning sensor, an image sensor or a laser radar sensor.

The embodiment shown in FIG. 1 is further described below by respectively taking the positioning sensor, the image sensor and the laser radar sensor as an example.

(1) The Positioning Sensor

In a driverless vehicle, the positioning sensor is used to position the vehicle. Causes for abnormality of the positioning sensor might comprise physical damages to the sensor, hacker's attack or the like. For example, a hacker may attack the positioning sensor through counterfeiting or tampering of positioning data, signal interference, signal shielding or the like, thereby causing the positioning sensor to malfunction.

Monitoring in the following aspects may be mainly performed with respect to the positioning sensor:

A. Monitoring the physical state of the positioning sensor.

The physical state may comprise position, connection, power-on, signal reception, data transmission and the like.

B. Monitoring the data transmission state of the positioning sensor

The data transmission state may comprise data size, format, frequency, hash value, timestamp and the like.

If the hash value is wrong, or the data size is abnormal or the transmission frequency is abnormal, the data transmission state of the positioning sensor may be determined as being abnormal.

C. Monitoring the output data of the positioning sensor, and using predetermined data to perform cross-validation for the output data.

How to perform cross-validation may depend on actual needs, for example, in manners which include but are not limited to the following manners:

1) Manner 1

In this manner, a lane where a positioning result output by the positioning sensor lies may be first determined according to the high-precision map.

The high-precision map is a map used by the driverless vehicle. As compared with an ordinary map, the high-precision map includes richer information, for example, it may include specific information of traffic lights (coordinates, shape, number and the like), traffic sign information (shape, coordinates, indicated content of traffic signs), lane line information (lane line serial number, coordinates of a starting point and a finishing point, lane width and length, lane line curve description equation parameters and the like), key reference information (coordinates, height, size and the like).

Furthermore, it is feasible to acquire an image recognition result obtained according to output data of an image sensor, and determine the lane where the driverless vehicle lies according to the image recognition result.

Then, it is feasible to compare the lane where the positioning result lies with the lane where the driverless vehicle lies, and determine the positioning sensor as getting abnormal if the lane where the positioning result lies is inconsistent with the lane where the driverless vehicle lies.

2) Manner 2

In this manner, it is possible to compare the positioning result output by the positioning sensor with the positioning result output by the positioning sensor last time, and determine the positioning sensor as getting abnormal if a difference of the two positioning results does not match the driverless vehicle's travel speed.

The positioning result output last time refers to the positioning result output the latest time before the positioning result output this time.

For example, if a longitudinal distance between the two positioning results is by far larger than a vehicle travel distance, the positioning sensor may be determined as getting abnormal, and the vehicle travel distance may be obtained by calculating a vehicle travel speed and a positioning time interval and the like.

Once the positioning sensor is determined as getting abnormal in any one of the above manners A, B and C, it is feasible to give an alarm of the abnormality in a manner such as in-vehicle speech and/or image prompt, or remote notification of the vehicle owner, or record current traffic environment conditions and key data, or if necessary, activate a safety response policy such as pulling over to the curb, prompting manual intervention or the like.

(2) An Image Sensor

In the driverless vehicle, the image sensor is applied to detection and recognition of traffic lights, traffic signs, vehicles and people. Causes for abnormality of the image sensor might comprise physical damages to the sensor, a hacker's attack and the like, for example, a hacker attacks the image sensor by counterfeiting or tampering image data.

Monitoring in the following aspects may be mainly performed with respect to the image sensor:

A. Monitoring the physical state of the image sensor.

The physical state may comprise position, connection, power-on and the like.

B. Monitoring the data transmission state of the image sensor

The data transmission state may comprise data size, format, frequency, resolution, hash value, timestamp and the like.

If the hash value is wrong or the resolution changes, the data transmission state of the image sensor may be determined as getting abnormal.

C. Monitoring the output data of the image sensor, and using predetermined data to perform cross-validation for the output data.

How to perform cross-validation may depend on actual needs, for example, in manners which include but are not limited to the following manners:

1) Manner 1

In this manner, an image recognition result obtained according to the output data of the image sensor may be acquired.

If a traffic light or traffic sign is recognized from the image recognition result, but it is determined by querying the high-precision map that the traffic light or traffic sign does not exist at the position where the driverless vehicle lies, the image sensor may be determined as getting abnormal.

2) Manner 2

In this manner, an image recognition result obtained according to the output data of the image sensor may be acquired.

If a vehicle or pedestrian is recognized from the image recognition result, but the vehicle or pedestrian is not recognized from a point cloud recognition result obtained according to output data of a laser radar sensor, the image sensor may be determined as getting abnormal.

Once the image sensor is determined as getting abnormal in any one of the above manners A, B and C, it is feasible to give an alarm of the abnormality in a manner such as in-vehicle speech and/or image prompt, or remote notification of the vehicle owner, or record current traffic environment conditions and key data, or if necessary, activates a safety response policy such as pulling over to the curb, prompting manual intervention or the like.

(3) A Laser Radar Sensor

In a driverless vehicle, the laser radar sensor is applied to detection and recognition of vehicles, pedestrians and obstacles. Causes for abnormality of the laser radar sensor might comprise physical damages to the sensor, a hacker's attack and the like, for example, a hacker attacks the laser radar sensor by absorbing waves emitted by the laser radar for concealing and disguising, interfering in detection with a strong laser, or intruding inside to counterfeit or tamper data.

Monitoring in the following aspects may be mainly performed with respect to the laser radar sensor:

A. Monitoring the physical state of the laser radar sensor.

The physical state may comprise position, connection, power-on and the like.

B. Monitoring the data transmission state of the laser radar sensor

The data transmission state may comprise data size, format, frequency, hash value, timestamp, a reflection value, a height value and the like.

If the hash value is wrong, or the data size is abnormal or the transmission frequency is abnormal, the data transmission state of the laser radar sensor may be determined as being abnormal.

C. Monitoring the output data of the laser radar sensor, and using predetermined data to perform cross-validation for the output data.

How to perform cross-validation may depend on actual needs, for example, in manners which include but are not limited to the following manners:

First, a point cloud recognition result obtained according to output data of the laser radar sensor is acquired.

If an obstacle on the road is recognized from the point cloud recognition result but the obstacle is not recognized from both the image recognition result obtained according to the output data of the image sensor and an ultrasonic recognition result obtained according to output data of an ultrasonic sensor, the laser radar sensor may be determined as getting abnormal.

Or, if a vehicle is recognized from the point cloud recognition result but the vehicle is not recognized from both the image recognition result obtained according to the output data of the image sensor and an ultrasonic recognition result obtained according to output data of an ultrasonic sensor, the laser radar sensor may be determined as getting abnormal.

Once the laser radar sensor is determined as getting abnormal in any one of the above manners A, B and C, it is feasible to give an alarm of the abnormality in a manner such as in-vehicle speech and/or image prompt, or remote notification of the vehicle owner, or record current traffic environment conditions and key data, or if necessary, activate a safety response policy such as pulling over to the curb, prompting manual intervention or the like.

As can be seen from the above, according to the solution of the above method embodiment, the to-be-monitored sensor on the driverless vehicle may be monitored in real time, including monitoring the physical state, monitoring the data transmission state and monitoring the output data in a cross-validation manner, thereby finding in time that the sensor gets abnormal and thereby improving the driverless vehicle's safety.

As appreciated, for ease of description, the aforesaid method embodiments are all described as a combination of a series of actions, but those skilled in the art should appreciate that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above introduces the method embodiments. The solution of the present disclosure will be further described through an apparatus embodiment.

Figure 2:
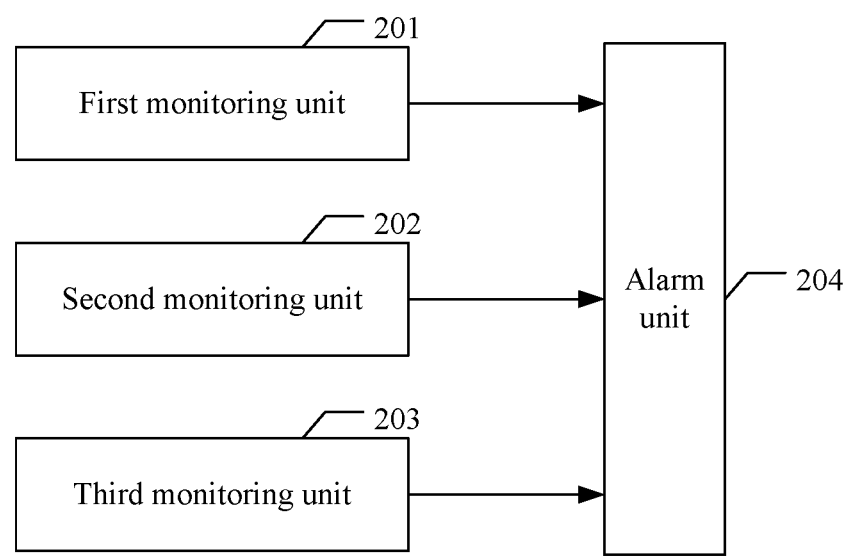
FIG. 2 is a structural schematic diagram of components of an embodiment of an apparatus of monitoring a sensor of a driverless vehicle according to the present disclosure.

FIG. 2 is a structural schematic diagram of components of an embodiment of an apparatus of monitoring a sensor of a driverless vehicle according to the present disclosure. As shown in FIG. 2, the apparatus comprises: a first monitoring unit 201, a second monitoring unit 202, a third monitoring unit 203 and an alarm unit 204.

The first monitoring unit 201 is configured to monitor a physical state of a to-be-monitored sensor.

The second monitoring unit 202 is configured to monitor a data transmission state of the to-be-monitored sensor;

The third monitoring unit 203 is configured to monitor output data of the to-be-monitored sensor, and use predetermined data to perform cross-validation for the output data.

The alarm unit 204 is configured to, when any monitoring result gets abnormal, determine the to-be-monitored sensor as getting abnormal, and give an alarm.

That is to say, if any one of the following happens, the alarm unit 204 may determine the to-be-monitored sensor as getting abnormal:

physical state abnormality;

data transmission state abnormality;

validation result abnormality.

The specific type of the to-be-monitored sensor may depend on actual needs, for example, a positioning sensor, an image sensor or a laser radar sensor.

When cross-validation is performed, the third monitoring unit 203 performs cross-validation for data transmitted from the to-be-monitored sensor by using one of output data of other sensors other than the to-be-monitored sensor, a high-precision map and data output by the to-be-monitored sensor last time, or combinations of at least two thereof.

The solution of the present embodiment is further described below by respectively taking the positioning sensor, the image sensor and the laser radar sensor as an example.

(1) The Positioning Sensor

In a driverless vehicle, the positioning sensor is used to position the vehicle. Causes for abnormality of the positioning sensor might comprise physical damages to the sensor, a hacker's attack or the like. For example, a hacker may attack the positioning sensor through counterfeiting or tampering of positioning data, signal interference, signal shielding or the like, thereby causing the positioning sensor to malfunction.

Monitoring in the following aspects may be mainly performed with respect to the positioning sensor:

A. The first monitoring unit 201 monitors the physical state of the positioning sensor.

The physical state may comprise position, connection, power-on, signal reception, data transmission and the like.

B. The second monitoring unit 202 monitors the data transmission state of the positioning sensor The data transmission state may comprise data size, format, frequency, hash value, timestamp and the like.

If the hash value is wrong, or the data size is abnormal or the transmission frequency is abnormal, the data transmission state of the positioning sensor may be determined as being abnormal.

C. The third monitoring unit 203 monitors the output data of the positioning sensor, and uses predetermined data to perform cross-validation for the output data.

How to perform cross-validation may depend on actual needs, for example, in manners which include but are not limited to the following manners:

1) Manner 1

In this manner, the third monitoring unit 203 may first determine a lane where a positioning result output by the positioning sensor lies, according to the high-precision map.

Furthermore, the third monitoring unit 203 may acquire an image recognition result obtained according to output data of an image sensor, and determine the lane where the driverless vehicle lies according to the image recognition result.

Then, the third monitoring unit 203 compares the lane where the positioning result lies with the lane where the driverless vehicle lies, and determine the positioning sensor as getting abnormal if the lane where the positioning result lies is inconsistent with the lane where the driverless vehicle lies.

2) Manner 2

In this manner, the third monitoring unit 203 compares the positioning result output by the positioning sensor with a positioning result output by the positioning sensor last time, and determines the positioning sensor as getting abnormal if a difference of the two positioning results does not match the driverless vehicle's travel speed.

For example, if a longitudinal distance between the two positioning results is far larger than a vehicle travel distance, the positioning sensor may be determined as getting abnormal, and the vehicle travel distance may be obtained by calculating a vehicle travel speed and a positioning time interval and the like.

Once the monitoring result of any one of the first monitoring unit 201, the second monitoring unit 202 and the third monitoring unit 203 gets abnormal, the alarm unit 204 gives an alarm of abnormality in a manner such as in-vehicle speech and/or image prompt, or remote notification of the vehicle owner, or records current traffic environment conditions and key data, or if necessary, activates a safety response policy such as pulling over to the curb, prompting manual intervention or the like.

(2) An Image Sensor

In the driverless vehicle, the image sensor is applied to detection and recognition of traffic lights, traffic signs, vehicles and people. Causes for abnormality of the image sensor might comprise physical damages to the sensor, a hacker's attack and the like, for example, a hacker attacks the image sensor by counterfeiting or tampering image data.

Monitoring in the following aspects may be mainly performed with respect to the image sensor:

A. The first monitoring unit 201 monitors the physical state of the image sensor.

The physical state may comprise position, connection, power-on and the like.

B. The second monitoring unit 202 monitors the data transmission state of the image sensor The data transmission state may comprise data size, format, frequency, resolution, hash value, timestamp and the like.

If the hash value is wrong or the resolution changes, the data transmission state of the image sensor may be determined as being abnormal.

C. The third monitoring unit 203 monitors the output data of the image sensor, and uses predetermined data to perform cross-validation for the output data.

How to perform cross-validation may depend on actual needs, for example, in manners which include but are not limited to the following manners:

1) Manner 1

In this manner, the third monitoring unit 203 may acquire an image recognition result obtained according to the output data of the image sensor.

If a traffic light or traffic sign is recognized from the image recognition result, but it is determined by querying the high-precision map that the traffic light or traffic sign does not exist at the position where the driverless vehicle lies, the image sensor may be determined as getting abnormal.

2) Manner 2

In the manner, the third monitoring unit 203 may acquire an image recognition result obtained according to the output data of the image sensor.

If a vehicle or pedestrian is recognized from the image recognition result, but the vehicle or pedestrian is not recognized from a point cloud recognition result obtained according to output data of a laser radar sensor, the image sensor may be determined as getting abnormal.

Once the monitoring result of any one of the first monitoring unit 201, the second monitoring unit 202 and the third monitoring unit 203 gets abnormal, the alarm unit 204 gives an alarm of abnormality in a manner such as in-vehicle speech and/or image prompt, or remote notification of the vehicle owner, or records current traffic environment conditions and key data, or if necessary, activates a safety response policy such as pulling over to the curb, prompting manual intervention or the like.

(3) A Laser Radar Sensor

In a driverless vehicle, the laser radar sensor is applied to detection and recognition of vehicles, pedestrians and obstacles. Causes for abnormality of the laser radar sensor might comprise physical damages to the sensor, a hacker's attack and the like, for example, a hacker attacks the laser radar sensor by absorbing waves emitted by the laser radar for concealing and disguising, interfering in detection with a strong laser, or intruding inside to counterfeit or tamper data.

Monitoring in the following aspects may be mainly performed with respect to the laser radar sensor:

A. The first monitoring unit 201 monitors the physical state of the laser radar sensor.

The physical state may comprise position, connection, power-on and the like.

B. The second monitoring unit 202 monitors the data transmission state of the laser radar sensor The data transmission state may comprise data size, format, frequency, hash value, timestamp, a reflection value, a height value and the like.

If the hash value is wrong, or the data size is abnormal or the transmission frequency is abnormal, the data transmission state of the laser radar sensor may be determined as being abnormal.

C. The third monitoring unit 203 monitors the output data of the laser radar sensor, and uses predetermined data to perform cross-validation for the output data.

How to perform cross-validation may depend on actual needs, for example, in manners which include but are not limited to the following manners:

First, the third monitoring unit 203 acquires a point cloud recognition result obtained according to output data of the laser radar sensor.

If an obstacle on the road is recognized from the point cloud recognition result but the obstacle is not recognized from both the image recognition result obtained according to the output data of the image sensor and an ultrasonic recognition result obtained according to output data of an ultrasonic sensor, the laser radar sensor may be determined as getting abnormal.

Or, if a vehicle is recognized from the point cloud recognition result but the vehicle is not recognized from both the image recognition result obtained according to the output data of the image sensor and an ultrasonic recognition result obtained according to output data of an ultrasonic sensor, the laser radar sensor may be determined as getting abnormal.

Once the monitoring result of any one of the first monitoring unit 201, the second monitoring unit 202 and the third monitoring unit 203 gets abnormal, the alarm unit 204 gives an alarm of abnormality in a manner such as in-vehicle speech and/or image prompt, or remote notification of the vehicle owner, or records current traffic environment conditions and key data, or if necessary, activates a safety response policy such as pulling over to the curb, prompting manual intervention or the like.

Reference may be made to corresponding depictions in the aforesaid method embodiment for a specific workflow of the apparatus embodiment shown in FIG. 2. The workflow is not detailed any more.

As can be seen from the above, according to the solution of the above apparatus embodiment, the to-be-monitored sensor on the driverless vehicle may be monitored in real time, including monitoring the physical state, monitoring the data transmission state and monitoring the output data in a cross-validation manner, thereby finding in time that the sensor gets abnormal and thereby improving the driverless vehicle's safety.

Figure 3:
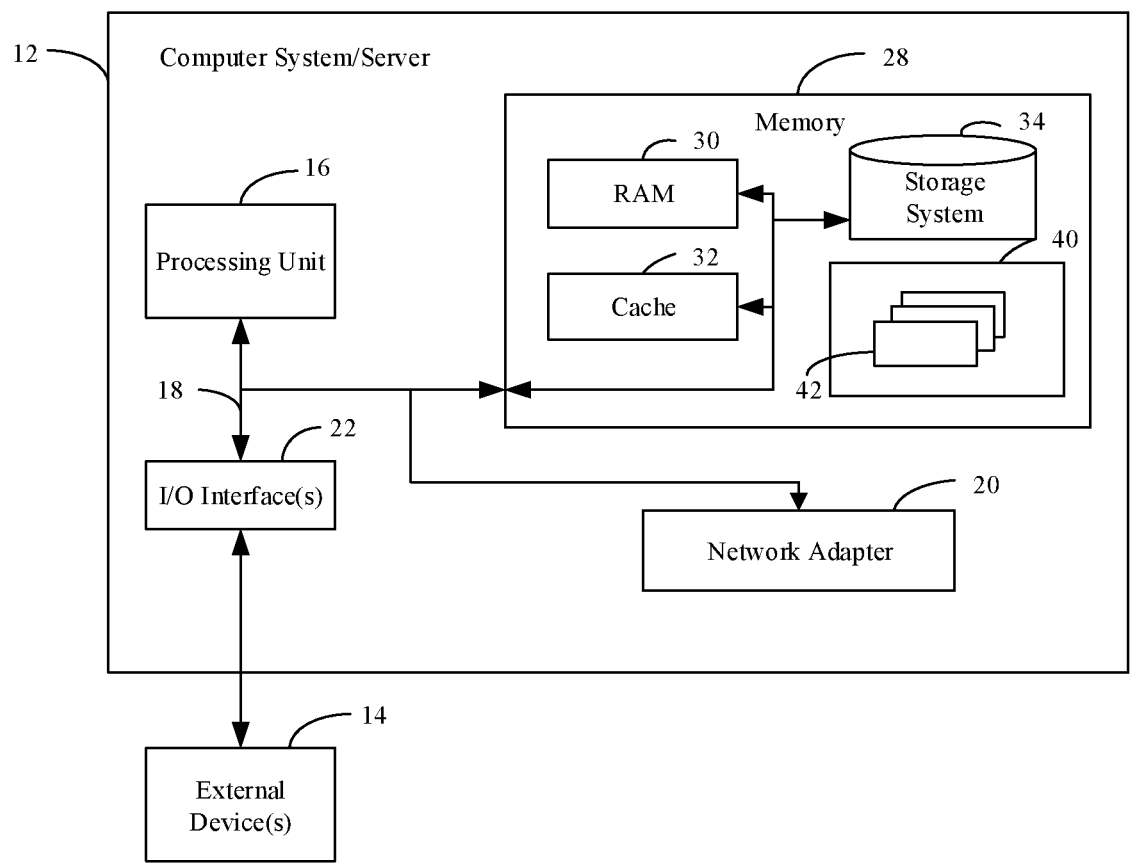
FIG. 3 illustrates a block diagram of an example computer system/server 12 adapted to implement an implementation mode of the present disclosure.

FIG. 3 illustrates a block diagram of an example computer system/server 12 adapted to implement an implementation mode of the present disclosure. The computer system/server 12 shown in FIG. 3 is only an example and should not bring about any limitation to the function and scope of use of the embodiments of the present disclosure.

As shown in FIG. 3, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 3, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implementing the method in the embodiments shown in FIG. 1, namely, monitoring a physical state of a to-be-monitored sensor; monitoring a data transmission state of the to-be-monitored sensor; monitoring output data of the to-be-monitored sensor, and using predetermined data to perform cross-validation for the output data; when any monitoring result gets abnormal, determining the to-be-monitored sensor as getting abnormal, and giving an alarm.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented method of monitoring a sensor of a driverless vehicle, wherein the computer-implemented method comprises, at the level of a computer device, the steps of:

monitoring a physical state of a monitored sensor, the physical state comprising one or more of position, connection, power-on, signal reception, or data transmission of the monitored sensor;

monitoring a data transmission state of the monitored sensor, the data transmission state comprising one or more of data size, format, frequency, resolution, hash value, timestamp, reflection value, or height value of the monitored sensor;

monitoring output data of the monitored sensor, and using predetermined data to perform cross-validation for the output data;

when (a) a result of monitoring the physical state or the data transmission state indicates a deviation from a predefined range of values for one or more criteria comprised by the physical state or the data transmission state or (b) there is a validation result abnormality, determining that the monitored sensor is getting abnormal, and giving an alarm in a manner comprising at least one of an in-vehicle speech, an image prompt, or a remote notification; and responsive to determining that the monitored sensor is getting abnormal, recording current traffic environment conditions and key data, and activating a safety response policy of the driverless vehicle;

wherein using the predetermined data to perform the cross-validation for the output data comprises performing cross-validation for the output data transmitted from the monitored sensor by using one of output data of other sensors other than the monitored sensor, a high-precision map, and data previously output by the monitored sensor, or combinations of at least two thereof;

wherein the monitored sensor is a laser radar sensor and performing the cross-validation for output data of the monitored sensor comprises:

acquiring a point cloud recognition result obtained according to output data of the laser radar sensor;

when a vehicle or an obstacle on a road is recognized from the point cloud recognition result but the vehicle or the obstacle is not recognized from both an image recognition result obtained according to output data of an image sensor and an ultrasonic recognition result obtained according to output data of an ultrasonic sensor, determining the laser radar sensor as getting abnormal;

wherein the abnormality of the laser radar sensor is caused by a hacker's attack or interfering in detection by the laser radar sensor with a strong laser, wherein the hacker's attack includes attacking the laser radar sensor by absorbing waves emitted by the laser radar for concealing and disguising.

2. The computer-implemented method according to claim 1, wherein the monitored sensor is a positioning sensor and performing the cross-validation for the output data of the monitored sensor comprises:

determining a lane where a positioning result output by the positioning sensor lies, according to the high-precision map;

acquiring an image recognition result obtained according to output data of an image sensor, and determining a lane where the driverless vehicle lies according to the image recognition result; and determining the positioning sensor as getting abnormal when the lane where the positioning result lies is inconsistent with the lane where the driverless vehicle lies;

or, comparing the positioning result output by the positioning sensor with a positioning result previously output by the positioning sensor;

determining the positioning sensor as getting abnormal when a difference of the two positioning results does not match the travel speed of the driverless vehicle.

3. The computer-implemented method according to claim 1, wherein the monitored sensor is an image sensor and performing the cross-validation for the output data of the monitored sensor comprises:

acquiring an image recognition result obtained according to output data of the image sensor;

when a traffic light or traffic sign is recognized from the image recognition result but it is determined by querying the high-precision map that the traffic light or traffic sign does not exist at a position where the driverless vehicle lies, determining the image sensor as getting abnormal;

or, acquiring an image recognition result obtained according to output data of the image sensor;

when a vehicle or pedestrian is recognized from the image recognition result but the vehicle or pedestrian is not recognized from a point cloud recognition result obtained according to output data of a laser radar sensor, determining the image sensor as getting abnormal.

4. A computer device, comprising a memory, a processor and a computer program which is stored on the memory and runs on the processor, wherein the processor, upon executing the computer program, implements a method of monitoring a sensor of a driverless vehicle, wherein the method comprises:

monitoring a physical state of a monitored sensor, the physical state comprising one or more of position, connection, power-on, signal reception, or data transmission of the monitored sensor;

monitoring a data transmission state of the monitored sensor, the data transmission state comprising one or more of data size, format, frequency, resolution, hash value, timestamp, reflection value, or height value of the monitored sensor;

monitoring output data of the monitored sensor, and using predetermined data to perform cross-validation for the output data;

when (a) a result of monitoring the physical state or the data transmission state indicates a deviation from a predefined range of values for one or more criteria comprised by the physical state or the data transmission state or (b) there is a validation result abnormality, determining that the monitored sensor is getting abnormal, and giving an alarm in a manner comprising at least one of an in-vehicle speech, an image prompt, or a remote notification; and responsive to determining that the monitored sensor is getting abnormal, recording current traffic environment conditions and key data, and activating a safety response policy of the driverless vehicle;

wherein using the predetermined data to perform the cross-validation for the output data comprises performing cross-validation for the output data transmitted from the monitored sensor by using one of output data of other sensors other than the monitored sensor, a high-precision map, and data previously output by the monitored sensor, or combinations of at least two thereof;

wherein when the monitored sensor is a laser radar sensor, performing the cross-validation for output data of the monitored sensor comprises:

acquiring a point cloud recognition result obtained according to output data of the laser radar sensor;

when a vehicle or an obstacle on a road is recognized from the point cloud recognition result but the vehicle or the obstacle is not recognized from both an image recognition result obtained according to output data of an image sensor and an ultrasonic recognition result obtained according to output data of an ultrasonic sensor, determining the laser radar sensor as getting abnormal;

wherein the abnormality of the laser radar sensor is caused by a hacker's attack or interfering in detection by the laser radar sensor with a strong laser, wherein the hacker's attack includes attacking the laser radar sensor by absorbing waves emitted by the laser radar for concealing and disguising.

5. The computer device according to claim 4, wherein when the monitored sensor is a positioning sensor, performing the cross-validation for the output data of the monitored sensor comprises:

determining a lane where a positioning result output by the positioning sensor lies, according to the high-precision map;

acquiring an image recognition result obtained according to output data of an image sensor, and determining a lane where the driverless vehicle lies according to the image recognition result;

determining the positioning sensor as getting abnormal if the lane where the positioning result lies is inconsistent with the lane where the driverless vehicle lies;

or, comparing the positioning result output by the positioning sensor with a positioning result previously output by the positioning sensor;

determining the positioning sensor as getting abnormal if a difference of the two positioning results does not match the travel speed of the driverless vehicle.

6. The computer device according to claim 4, wherein when the monitored sensor is an image sensor, performing the cross-validation for output data of the monitored sensor comprises:

acquiring an image recognition result obtained according to output data of the image sensor;

when a traffic light or traffic sign is recognized from the image recognition result but it is determined by querying the high-precision map that the traffic light or traffic sign does not exist at a position where the driverless vehicle lies, determining the image sensor as getting abnormal;

or, acquiring an image recognition result obtained according to output data of the image sensor;

when a vehicle or pedestrian is recognized from the image recognition result but the vehicle or pedestrian is not recognized from a point cloud recognition result obtained according to output data of a laser radar sensor, determining the image sensor as getting abnormal.

7. A non-transitory computer-readable storage medium on which a computer program is stored, wherein the computer program, when executed by a processor, implements a method of monitoring a sensor of a driverless vehicle, wherein the method comprises:

monitoring a physical state of a monitored sensor, the physical state comprising one or more of position, connection, power-on, signal reception, or data transmission of the monitored sensor;

monitoring a data transmission state of the monitored sensor, the data transmission state comprising one or more of data size, format, frequency, resolution hash value, timestamp, reflection value, or height value of the monitored sensor;

monitoring output data of the monitored sensor, and using predetermined data to perform cross-validation for the output data;

when (a) a result of monitoring the physical state or the data transmission state indicates a deviation from a predefined range of values for one or more criteria comprised by the physical state or the data transmission state or (b) there is a validation result abnormality, determining that the monitored sensor is getting abnormal, and giving an alarm in a manner comprising at least one of an in-vehicle speech, an image prompt, or a remote notification; and responsive to determining that the monitored sensor is getting abnormal, recording current traffic environment conditions and key data, and activating a safety response policy of the driverless vehicle;

wherein using the predetermined data to perform the cross-validation for the output data comprises performing cross-validation for the output data transmitted from the monitored sensor by using one of output data of other sensors other than the monitored sensor, a high-precision map, and data previously output by the monitored sensor, or combinations of at least two thereof;

wherein when the monitored sensor is a laser radar sensor, performing the cross-validation for output data of the monitored sensor comprises:

acquiring a point cloud recognition result obtained according to output data of the laser radar sensor;

when a vehicle or an obstacle on a road is recognized from the point cloud recognition result but the vehicle or the obstacle is not recognized from both an image recognition result obtained according to output data of an image sensor and an ultrasonic recognition result obtained according to output data of an ultrasonic sensor, determining the laser radar sensor as getting abnormal;

wherein the abnormity of the laser radar sensor is caused by a hacker's attack or interfering in detection by the laser radar sensor with a strong laser, wherein the hacker's attack includes attacking the laser radar sensor by absorbing waves emitted by the laser radar for concealing and disguising.

8. The non-transitory computer-readable storage medium according to claim 7, wherein when the monitored sensor is a positioning sensor, performing the cross-validation for the output data of the monitored sensor comprises:

determining a lane where a positioning result output by the positioning sensor lies, according to the high-precision map;

acquiring an image recognition result obtained according to output data of an image sensor, and determining a lane where the driverless vehicle lies according to the image recognition result;

determining the positioning sensor as getting abnormal if the lane where the positioning result lies is inconsistent with the lane where the driverless vehicle lies;

or, comparing the positioning result output by the positioning sensor with a positioning result previously output by the positioning sensor;

determining the positioning sensor as getting abnormal if a difference of the two positioning results does not match the travel speed of the driverless vehicle.

9. The non-transitory computer-readable storage medium according to claim 8, wherein when the monitored sensor is an image sensor, performing the cross-validation for the output data of the monitored sensor comprises:

acquiring an image recognition result obtained according to output data of the image sensor;

when a traffic light or traffic sign is recognized from the image recognition result but it is determined by querying the high-precision map that the traffic light or traffic sign does not exist at a position where the driverless vehicle lies, determining the image sensor as getting abnormal;

or, acquiring an image recognition result obtained according to output data of the image sensor;

when a vehicle or pedestrian is recognized from the image recognition result but the vehicle or pedestrian is not recognized from a point cloud recognition result obtained according to output data of a laser radar sensor, determining the image sensor as getting abnormal.

* * * * *